(12) United States Patent
Lee et al.

(10) Patent No.: US 10,474,758 B2
(45) Date of Patent: Nov. 12, 2019

(54) METHOD AND APPARATUS FOR MACHINE TRANSLATION USING NEURAL NETWORK AND METHOD OF TRAINING THE APPARATUS

(71) Applicant: SAMSUNG ELECTRONICS CO., LTD., Suwon-si (KR)

(72) Inventors: Min-Joong Lee, Suwon-si (KR); YoungSang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/975,927

(22) Filed: May 10, 2018

(65) Prior Publication Data

US 2018/0373704 A1 Dec. 27, 2018

(30) Foreign Application Priority Data

Jun. 21, 2017 (KR) .................. 10-2017-0078398

(51) Int. Cl.
*G06F 17/28* (2006.01)
*G10L 13/00* (2006.01)
(Continued)

(52) U.S. Cl.
CPC ........ *G06F 17/289* (2013.01); *G06F 17/2845* (2013.01); *G06F 17/2854* (2013.01);
(Continued)

(58) Field of Classification Search
CPC .. G06F 17/28; G06F 17/2845; G06F 17/2854; G06F 17/2863; G06F 17/2881;
(Continued)

(56) References Cited

U.S. PATENT DOCUMENTS 4,907,283 A * 3/1990 Tanaka .................. G06K 9/00
382/229
10,067,939 B2 * 9/2018 Na ....................... G06F 17/2809
(Continued)

FOREIGN PATENT DOCUMENTS

| JP | 2008-210206 A | 9/2008 |
| KR | 10-2012-0048139 A | 5/2012 |
| KR | 10-2016-0133349 A | 11/2016 |

OTHER PUBLICATIONS

Gulcehre, Caglar, et al. "On Using Monolingual Corpora in Neural Machine Translation." *arXiv preprint arXiv:1503.03535* (2015). (9 pages, in English).

(Continued)

*Primary Examiner* — Khai N. Nguyen
(74) *Attorney, Agent, or Firm* — NSIP Law

(57) ABSTRACT

A machine translation method and a machine translation apparatus using a neural network model are provided. The machine translation apparatus extracts information associated with a keyword from a source sentence, obtains a supplement sentence associated with the source sentence based on the extracted information associated with the keyword, acquires a first vector value from the source sentence and a second vector value from the supplement sentence using neural network model-based encoders, and outputs a target sentence corresponding to a translation of the source sentence based on any one or any combination of the first vector value and the second vector value using a neural network model-based decoder.

23 Claims, 10 Drawing Sheets

(51) Int. Cl.
*G10L 21/00* (2013.01)
*G10L 25/00* (2013.01)
*G06N 3/08* (2006.01)

(52) U.S. Cl.
CPC ...... *G06F 17/2863* (2013.01); *G06F 17/2881* (2013.01); *G06N 3/08* (2013.01)

(58) Field of Classification Search
CPC ......... G06F 17/289; G06N 3/08; G10L 15/16; G10L 17/04
USPC ................ 704/2, 4, 202, 232, 239, 252, 277
See application file for complete search history.

(56) References Cited

U.S. PATENT DOCUMENTS

| | | | | |
|---|---|---|---|---|
| 2002/0010573 | A1* | 1/2002 | Wakita | G06F 17/2795 704/2 |
| 2003/0101153 | A1* | 5/2003 | Francis | G06Q 10/10 706/47 |
| 2007/0198245 | A1* | 8/2007 | Kamatani | G06F 17/289 704/2 |
| 2010/0179803 | A1* | 7/2010 | Sawaf | G06F 17/28 704/2 |
| 2010/0262575 | A1* | 10/2010 | Moore | G06N 20/00 706/52 |
| 2012/0101804 | A1* | 4/2012 | Roth | G06F 17/2818 704/2 |
| 2012/0330647 | A1* | 12/2012 | Burges | G06F 17/277 704/9 |
| 2013/0246322 | A1* | 9/2013 | De Sousa Webber | G06N 3/0454 706/18 |
| 2014/0365201 | A1* | 12/2014 | Gao | G06F 17/2818 704/2 |
| 2015/0052084 | A1* | 2/2015 | Kolluru | G06F 16/90335 706/11 |
| 2016/0117316 | A1* | 4/2016 | Le | G06N 3/0445 704/9 |
| 2016/0306794 | A1 | 10/2016 | Huang et al. | |
| 2017/0308526 | A1* | 10/2017 | Uchiyama | G06F 17/2818 |
| 2018/0052828 | A1* | 2/2018 | Na | G06F 17/2809 |
| 2018/0052829 | A1* | 2/2018 | Lee | G06F 17/2755 |
| 2018/0121419 | A1* | 5/2018 | Lee | G06F 17/2785 |
| 2018/0373704 | A1* | 12/2018 | Lee | G06F 17/289 |
| 2019/0034416 | A1* | 1/2019 | Al Hasan | G06F 17/2785 |

OTHER PUBLICATIONS

Luong, Thang et al. *Neural Machine Translation—Tutorial ACL 2016.* sites.google.com/site/acl16nmt/home. (5 pages, in English).
Zoph, Barret, et al. "Multi-Source Neural Translation." *arXiv preprint arXiv:1601.00710* (2016). (5 pages, in English).

* cited by examiner

METHOD AND APPARATUS FOR MACHINE TRANSLATION USING NEURAL NETWORK AND METHOD OF TRAINING THE APPARATUS

CROSS-REFERENCE TO RELATED APPLICATION(S)

This application claims the benefit under 35 USC § 119(a) of Korean Patent Application No. 10-2017-0078398 filed on Jun. 21, 2017 in the Korean Intellectual Property Office, the entire disclosure of which is incorporated herein by reference for all purposes.

BACKGROUND

1. Field

The following description relates to a technology of translating a sentence using a neural network model.

2. Description of Related Art

Machine translation refers to translation carried out by a computer. Machine translation can be rule-based, example-based, statistics-based, or artificial neural network-based. Artificial neural network-based machine translation is more accurate than other types of machine translation due to development in neural network technology and deep learning technology.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a machine translation method using a neural network model, the method including extracting information associated with a keyword from a source sentence, obtaining a supplement sentence associated with the source sentence based on the extracted information associated with the keyword, acquiring, using neural network model-based encoders, a first vector value from the source sentence and a second vector value from the supplement sentence, and outputting, using a neural network model-based decoder, a target sentence corresponding to a translation of the source sentence based on any one or any combination of the first vector value or the second vector value.

The target sentence may include determining a third vector value by combining the first vector value and the second vector value, and acquiring the target sentence based on the third vector value.

The outputting of the target sentence may include outputting the target sentence based on a third vector value determined by combining the first vector value and the second vector value in response, to the first vector value satisfying a condition, and outputting the target sentence based on the first vector value, in response to the first vector value not satisfying the condition.

The first vector value may be acquired from the second vector value and the source sentence using the neural network model-based encoders.

The obtaining of the supplement sentence may include searching for the supplement sentence based on the information associated with the keyword.

The extracting of the information associated with the keyword may include extracting the information associated with the keyword based on any one or any combination of a number of documents including the keyword, a number of times the keyword appears in the documents, and a number of documents searched.

The searching for the supplement sentence may include searching for the supplement sentence from any one or any combination of a database or the Internet based on the information associated with the keyword.

The information associated with the keyword may include any one or any combination of the keyword, a plurality of keywords, a value indicating the keyword, a value indicating the plurality of keywords, and a value indicating a feature of an entire sentence including the keyword.

In another general aspect, there is provided a machine translation training method using a neural network model, the method including extracting information associated with a keyword from a training source sentence, obtaining a training supplement sentence associated with the training source sentence based on the extracted information associated with the keyword, acquiring, using neural network model-based encoders, a first vector value from the training source sentence and a second vector value from the training supplement sentence, outputting, using a neural network model-based decoder, a target sentence corresponding to translation of the training source sentence based on any one or any combination of the first vector value or the second vector value, and training the encoders and the decoder by evaluating an accuracy of the target sentence.

The outputting of the target sentence may include determining a third vector value by combining the first vector value and the second vector value, and acquiring the target sentence based on the third vector value.

The outputting of the target sentence may include outputting the target sentence based on a third vector value determined by combining the first vector value and the second vector value, in response to the first vector value satisfying a condition, and outputting the target sentence based on the first vector value, in response to the first vector value not satisfying the condition.

The first vector value may include acquired from the second vector value and the training source sentence using the neural network model-based encoders.

The obtaining of the training supplement sentence may include searching for the training supplement sentence based on the information associated with the keyword.

The extracting of the information associated with the keyword may include extracting the information associated with the keyword based on any one or any combination of a number of documents including the keyword, a number of times the keyword appears in the documents, and a number of documents searched.

The searching for the training supplement sentence may include searching for the training supplement sentence from any one or any combination of a database or the Internet based on the information associated with the keyword.

The accuracy of the target sentence may include evaluated based on a comparison of the target sentence to another translation of the training source sentence.

In another general aspect, there is provided a machine translation apparatus using a neural network model, the apparatus including a processor configured to extract information associated with a keyword from a source sentence, obtain a supplement sentence associated with the source sentence based on the extracted information associated with the keyword, acquire a first vector value from the source sentence and a second vector value from the supplement sentence, and output a target sentence corresponding to a translation of the source sentence based on any one or any combination of the first vector value and the second vector value.

The processor may be configured to determine a third vector value by combining the first vector value and the second vector value, and to output the target sentence based on the third vector value using a neural network model-based decoder.

The apparatus may be configured to output the target sentence based on a third vector value determined by combining the first vector value and the second vector value using a neural network model-based decoder, in response to the first vector value satisfying a condition, and to output the target sentence based on the first vector value using the neural network model-based decoder, in response to the first vector value not satisfying the preset condition.

The processor may be configured to acquire the first vector value from the second vector value and the source sentence using neural network model-based encoders.

In another general aspect, there is provided a translation apparatus based on a neural network model set, the apparatus including a sensor configured to receive a source sentence, and a processor configured to extract information associated with a keyword from the source sentence, obtain a supplement sentence associated with the source sentence based on the extracted information, acquire, using neural network model-based encoders, a first vector value from the source sentence and a second vector value from the supplement sentence, and output, using neural network model-based decoder, a translated sentence based on any one or any combination of the first vector value and the second vector value to a display, wherein the neural network model set may include the neural network model-based encoders, and the neural network model-based decoder.

The translation apparatus may include a memory configured to store instructions to be executed by the processor, to store the neural network model set, the source sentence, and the supplement sentence.

Other features and aspects will be apparent from the following detailed description, the drawings, and the claims.

Figure 1:
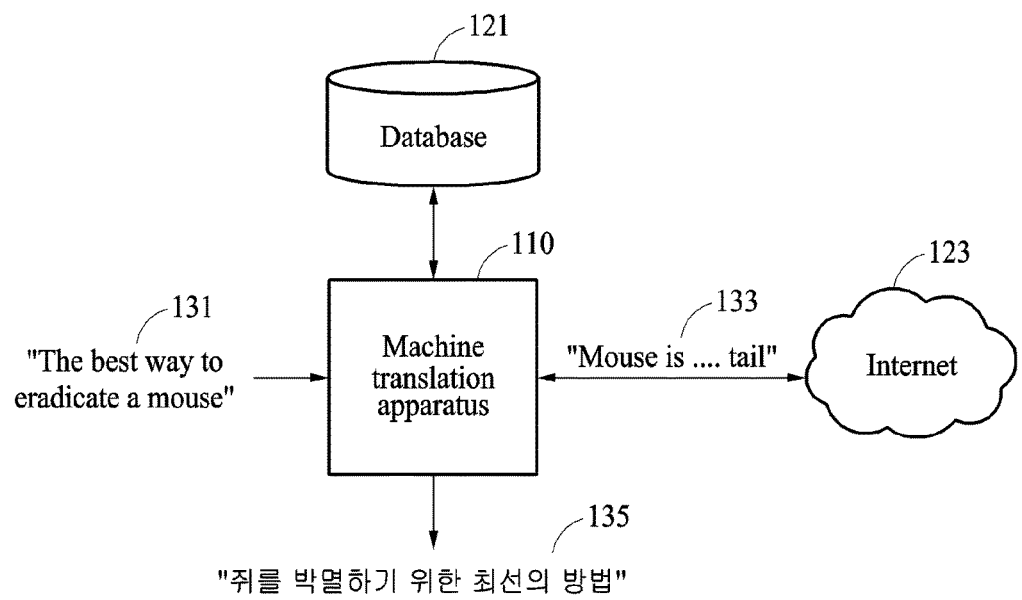
FIG. 1 illustrates an example of an apparatus for performing a machine translation using a neural network model.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The following specific structural or functional descriptions are exemplary, and the scope of the examples is not limited to the descriptions provided in the present specification. Various changes and modifications can be made thereto by those after gaining a thorough understanding of the disclosure of this application.

Terms such as first, second, A, B, (a), (b), and the like may be used herein to describe components. Each of these terminologies is not used to define an essence, order, or sequence of a corresponding component but used merely to distinguish the corresponding component from other component(s). For example, a first component may be referred to as a second component, and similarly the second component may also be referred to as the first component.

If it is described in the specification that one component is "connected," "coupled," or "joined" to another component, a third component may be "connected," "coupled," and "joined" between the first and second components, although the first component may be directly connected, coupled or joined to the second component. In addition, it should be noted that if it is described in the specification that one component is "directly connected" or "directly joined" to another component, a third component may not be present therebetween. Likewise, expressions, for example, "between" and "immediately between" and "adjacent to" and "immediately adjacent to" may also be construed as described in the foregoing.

As used herein, the singular forms are intended to include the plural forms as well, unless the context clearly indicates otherwise.

A function or an operation illustrated in a block may be performed not in a sequential order according to examples. For example, functions or operations illustrated in successive blocks may be actually performed concurrently, or an order of the blocks may be changed based on related functions or operations.

FIG. 1 illustrates an example of an apparatus for performing a machine translation using a neural network model.

A machine translation apparatus 110 may enhance an accuracy in translation of a source sentence 131 using a supplement sentence 133 associated with the source sentence 131. The source sentence 131 indicates a sentence to be translated. The source sentence 131 is received by the translation apparatus 110 through a sensor or any input device. A target sentence 135 indicates a result of a translation corresponding to the source sentence 131. The supplement sentence 133 is associated with the source sentence 131 and indicates a sentence that enhances an accuracy of the target sentence 135. The supplement sentence 133 is not limited to a sentence. The supplement sentence 133 may include a word, a phrase, or a paragraph. The supplement paragraph 133 is referred to as an assistant sentence.

For example, the machine translation apparatus 110 translates the source sentence 131, "The best way to eradicate a mouse." If training data associated with "mouse" is insufficiently provided in a process of training the machine translation apparatus 110, in the target sentence 135 may be inaccurately translated. However, if the machine translation apparatus 110 more accurately interprets a meaning of "mouse" using the supplement sentence 133, "Mouse is . . . tail", the machine translation apparatus 110 may accurately translate the source sentence 131 to the target sentence 135, "쥐를 박멸하기 위한 최선의 방법."

The training data is classified into a parallel corpus and a mono corpus. The parallel corpus indicates data including a pair of an input and an output corresponding to the input. The mono corpus indicates data including an input without an output corresponding to the input.

A training apparatus may enhance an accuracy of the machine translation apparatus 110 by training the machine translation apparatus 110 using the parallel corpus. The training apparatus inputs a training source sentence to the machine translation apparatus 110, and outputs a target sentence. The training apparatus verifies accuracy by comparing a target sentence to another pair of the parallel corpus of a training source sentence. Here, another pair of the training source sentence is an accurate translation result corresponding to the training source sentence. The training apparatus may adjust an internal parameter of the machine translation apparatus 110 to increase the accuracy in response to the accuracy being less than a threshold.

As a number of parallel corpuses increases, the accuracy of the machine translation apparatus 110 increases. However, it may be difficult to obtain a number of parallel corpuses. Millions to tens of thousands of parallel corpuses may need to be acquired as training data to obtain a sufficient degree of accuracy, but acquiring such training data involves substantial costs. Errors may occur in the he machine translation apparatus 110 for a word or a sentence that is not learned in a training process. For example, the machine translation apparatus 110 may translate the word or the sentence that is not learned into a word or a sentence having a completely different meaning, or into a different word or a different sentence having a similar spelling.

In an example, the training apparatus for training the machine translation apparatus 110 acquires the sufficient volume of training data by searching for the supplement sentence 133 based on the source sentence 131. The training apparatus may decrease a probability of an error by allowing the machine translation apparatus 110 to learn a word or a sentence that is not included in the parallel corpus using the mono corpus.

The supplement sentence 133 is a type of mono corpus. It is easier to secure a number of mono corpuses than to secure a number of parallel corpuses. The mono corpus includes all pieces of electronically stored information. In an example, the machine translation apparatus 110 searches for the supplement sentence 133 associated with the source sentence 131 from a database 121 of the mono corpus. In another example, the machine translation apparatus 110 secures the number of mono corpuses from the Internet 123 and searches for the supplement sentence 133 associated with the source sentence 131 from the Internet 123.

In an example, the machine translation apparatus 110 translates the source sentence 131 using a neural network model. The neural network model is also referred to as an artificial neural network model. The training apparatus may train the machine translation apparatus 110 based on an end-to-end method using the neural network model and thus, the training apparatus may not need to separately learn a language model associated with a supplement sentence. The end-to-end method refers to a method of directly adjusting a weight of each layer from an output corresponding to an input in an entire path from an input layer to an output layer via a hidden layer in a neural network. The machine translation apparatus 110 may combine a source sentence and a supplement sentence in various ways.

Figure 2:
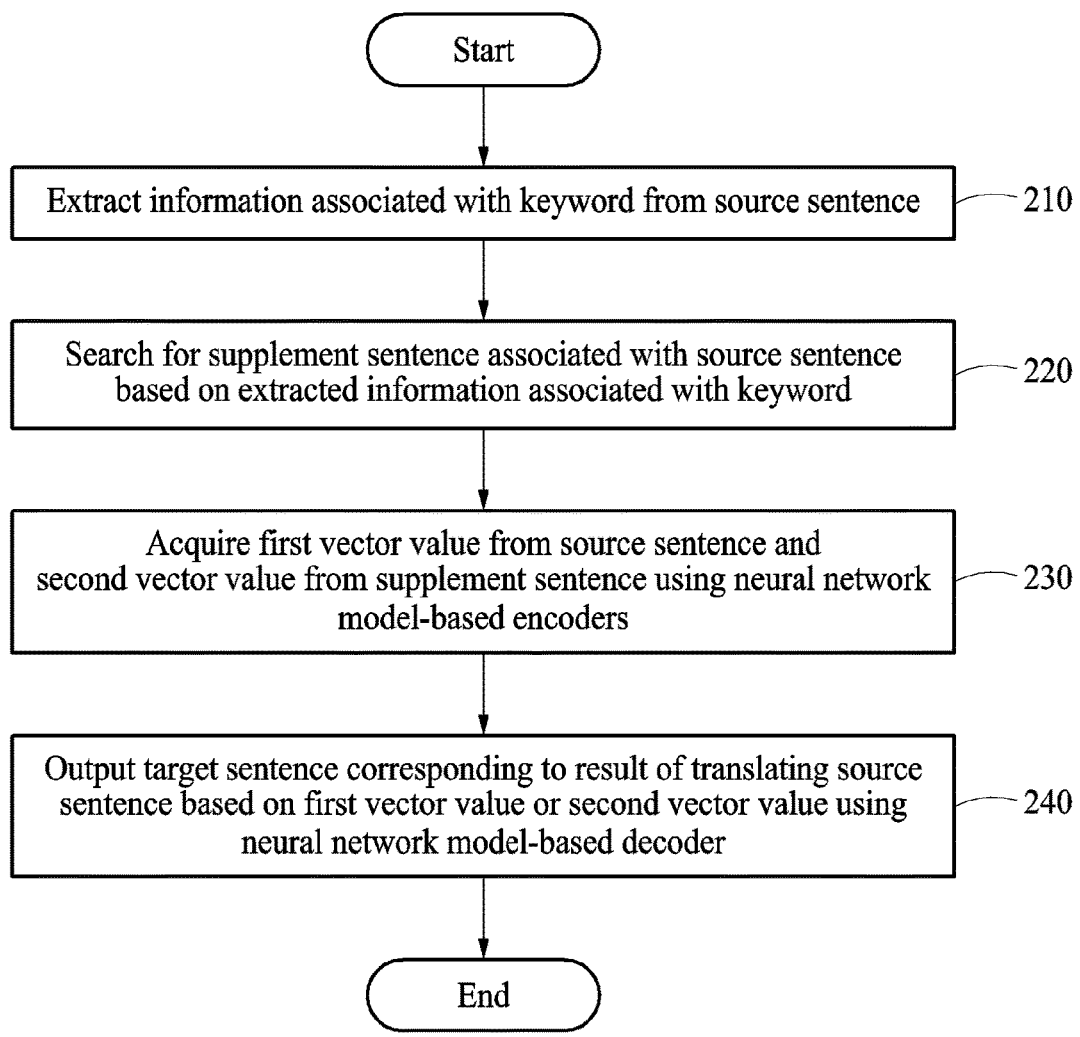
FIG. 2 is a diagram illustrating an example of performing a machine translation using a neural network model.

FIG. 2 is a diagram illustrating an example of performing a machine translation using a neural network model. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the descriptions of FIG. 1 is also applicable to FIG. 2, and are incorporated herein by reference. Thus, the above description may not be repeated here.

A machine translation apparatus searches for, from a mono corpus, a supplement sentence associated with a source sentence based on the source sentence, and enhances a performance in translation using the supplement sentence. The machine translation apparatus may extract information associated with a keyword from the source sentence and search for the supplement sentence from the mono corpus based on the extracted information associated with the keyword.

In operation 210, the machine translation apparatus extracts the information associated with the keyword from the source sentence. The information associated with the keyword includes information such as, for example, one keyword, a plurality of keywords, a value indicating one keyword, a value indicating a plurality of keywords, or a value indicating a feature of an entire sentence including the keyword.

The machine translation apparatus may extract the information associated with the keyword from the source sentence based on various methods, such as, for example, by evaluating a relative importance of each word in a sentence or a document or based on a number of documents including the keyword, a number of times the keyword appears in the documents, and a number of all documents to search for.

In an example, the machine translation apparatus uses a term frequency-inverse document frequency (TF-IDF) method based on Equation 1.

$$w_{i,j} = tf_{i,j} \times \log\left(\frac{N}{df_i}\right) \qquad \text{[Equation 1]}$$

In Equation 1, i denotes an identification number of a word and j denotes an identification number of a sentence or a document including the word. $W_{i,j}$ denotes a TF-IDF value in the sentence j or the document j including the word i. $tf_{i,j}$ denotes a number of times the word i appears in the sentence j or the document j. $df_i$ denotes a number of documents including the word i. N denotes a number of all documents.

$\log(N/df_i)$ denotes an IDF value. The IDF value increases as a number of times a corresponding word appears in all documents decreases. In an example, the machine translation apparatus increases an IDF value of a word that is not learned because a number of words is less or the word is not included in a parallel corpus, using all sentences in the parallel corpus instead of using all documents. As the IDF value increases, a probability that the word that is not learned is selected as a keyword may increase.

In an example, the machine translation apparatus selects a word having a greatest IDF value as a keyword. The machine translation apparatus may search for a supplement sentence from a mono corpus using the keyword and enhance accuracy in translation using the supplement sentence to translate a source sentence.

In operation 220, the machine translation apparatus searches for the supplement sentence associated with the source sentence based on the extracted information associated with the keyword. The machine translation apparatus may search for the supplement sentence for translating the source sentence among a plurality of sentences in the mono corpus based on various methods.

In an example, the machine translation apparatus searches for a supplement sentence based on an inverted index method. The inverted index method searches for a sentence or a document using a keyword. The machine translation apparatus may search for the supplement sentence from the mono corpus based on the inverted index method using the information associated with the keyword.

For example, when the machine translation apparatus extracts the information associated with the keyword based on the TF-IDF method, the machine translation apparatus searches for the supplement sentence based on a word having a greatest IDF value. The machine translation apparatus may select a candidate sentence to be well matched to a corresponding word as a supplement sentence based on a number of times the word appears in the candidate sentence.

In an example, the machine translation apparatus uses a neural network model. An encoder and a decoder of the machine translation apparatus may be a type of the neural network model. The machine translation apparatus may acquire an encoding result by inputting the source sentence and the supplement sentence to the encoder of the neural network model. In operation 230, the machine translation apparatus acquires a first vector value from the source sentence and a second vector value from the supplement sentence using neural network model-based encoders.

An encoder may convert a sentence to be input into a vector value. The vector value may represent or express the sentence to be input. The machine translation apparatus inputs the source sentence to a second encoder and acquires the first vector value corresponding to the source sentence from the second encoder. The machine translation apparatus inputs the supplement sentence to a first encoder and acquires the second vector value corresponding to the supplement sentence from the first encoder. However, an output of an encoder is not limited to a vector value. The output of encoder may include various types of encoding result to be compatible with an input of a decoder.

In operation 240, the machine translation apparatus outputs a target sentence corresponding to a result of translating the source sentence based on the first vector value or the second vector value using a neural network model-based decoder. The machine translation apparatus acquires a third vector value by combining the first vector value and the second vector value corresponding to the encoding result. The third vector value is referred to as a context vector value.

A method of combining the first vector value and the second vector value may vary. For example, the machine translation apparatus may combine the first vector value and the second vector value based on a gated sum method. The first vector value corresponding to the source sentence may be always reflected to the input of the decoder, but the second vector value corresponding to the supplement sentence may not be reflected to the input of the decoder according to a condition. As another example, the machine translation apparatus may combine the first vector value and the second vector value by acquiring the second vector value in response to the first vector value being input to the encoder. However, such combination method is only an example. Any type of function for inputting two vector values and outputting one vector value are considered to be well within the scope of the present disclosure.

The decoder may convert the converted vector value into a form of a sentence. Because the decoder is trained to output an accurate target sentence by receiving various training source sentences in a training process, the converted sentence may correspond to the result of translating the source sentence. Because the decoder receives the second vector value corresponding to the supplement sentence for translating the source sentence or the second vector value to be combined with the first vector value, the accuracy be greater than when using the first value.

Figure 3:
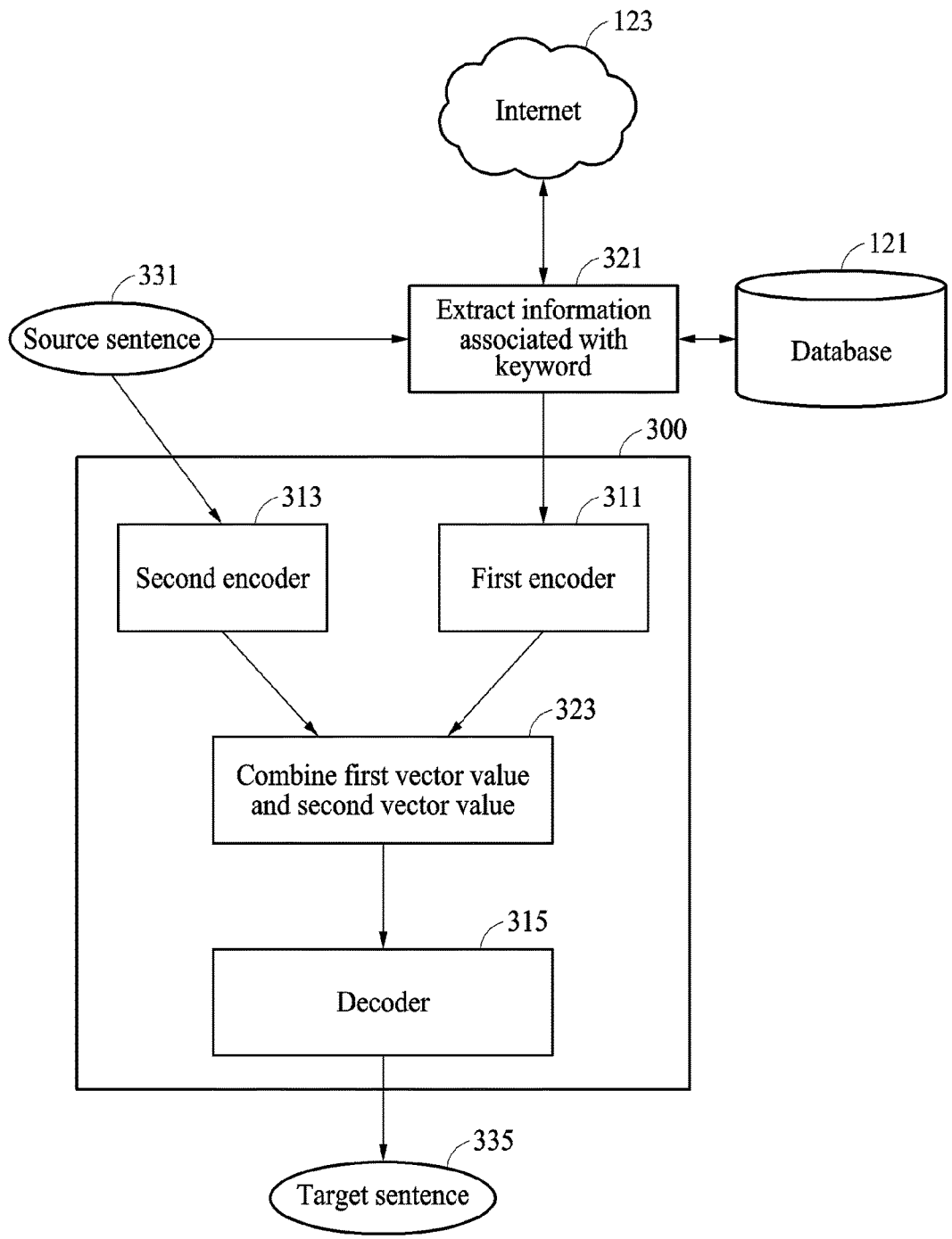
FIG. 3 illustrates an example of performing a machine translation by combining a first vector value and a second vector value.

FIG. 3 illustrates an example of performing a machine translation by combining a first vector value and a second vector value.

A machine translation apparatus converts a source sentence 331 into data in a form to be easily understood by a second encoder 313 and inputs the source sentence 331 to the second encoder 313. The second encoder 313 outputs a first vector value corresponding to the source sentence 331.

The machine translation apparatus extracts information associated with a keyword from the source sentence 331 in operation 321. The machine translation apparatus may search for a supplement sentence for translating the source sentence 331 from the database 121 or the Internet 123 based on the information associated with the keyword. The machine translation apparatus converts the supplement sentence into data that is understood by a first encoder 311 and inputs the supplement sentence to the first encoder 311. The first encoder 311 outputs a second vector value corresponding to the supplement sentence.

The machine translation apparatus may determine a third vector value by combining the first vector value and the second vector value in operation 323. In an example, the machine translation apparatus combines the first vector value and the second vector value after separately determining the first vector value and the second vector value. In an example, the machine translation apparatus combines the first vector value and the second vector value using various functions. In an example, the machine translation apparatus may acquires a target sentence 335 based on the third vector value. In an example, the machine translation apparatus acquires the target sentence 335 by inputting the third vector value to a decoder 315.

In an example, the machine translation apparatus combines the first vector value and the second vector value based on a gated sum method. For example, in response to the first vector value satisfying a preset condition, the machine translation apparatus determines the third vector value by combining the first vector value and the second vector value in operation 323. The machine translation apparatus may output the target sentence 335 based on the third vector value. In response to the first vector not satisfying the preset condition, the machine translation apparatus outputs the target sentence 335 based on the first vector value. In an example, the first vector does not satisfy the preset condition when the target sentence 335 having a sufficient degree of accuracy is output only with the first vector value.

Thus, the first vector value corresponding to the source sentence 331 is always reflected in an input of the decoder 315, but the second vector value corresponding to the supplement sentence may be reflected more or less, or may not be reflected to the input of the decoder 315, based to a condition. The machine translation apparatus may maintain a constant degree of accuracy while reducing the cost to combine the first vector value and the second vector value.

Figure 4:
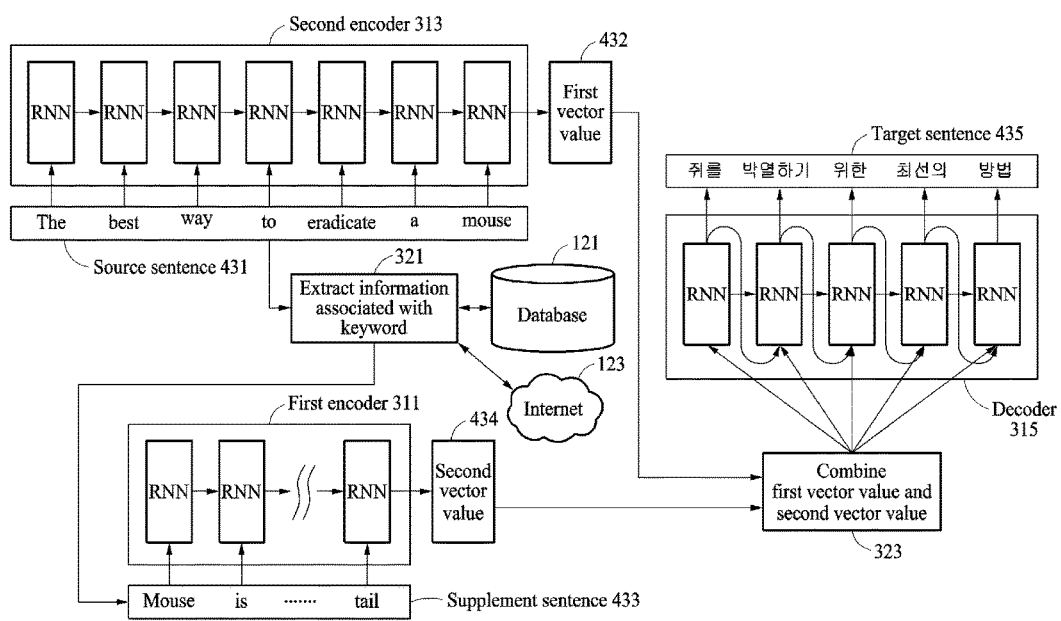
FIG. 4 illustrates an example of combining a first vector value and a second vector value using a neural network model.

FIG. 4 illustrates an example of combining a first vector value and a second vector value using a neural network model.

A machine translation apparatus uses neural network model-based encoders and a neural network model-based decoder, i.e., the first encoder 311, the second encoder 313, and the decoder 315. A neural network is associated with a recognition model implemented by software and hardware that copies a calculation ability of a biological apparatus using a great number of artificial neurons (or nodes). The neural network may perform a training process or a cognitive ability of human through artificial neurons. In an example, an encoder and a decoder use a recurrent neural network (RNN) model in which an output value of a hidden layer of a previous input is re-input to a hidden layer of a current input.

The machine translation apparatus inputs a source sentence 431, "The best way to eradicate a mouse", to the second encoder 313. The second encoder 313 outputs a first vector value 432 corresponding to the input source sentence 431.

The machine translation apparatus extracts information associated with a keyword from the source sentence 431. The machine translation apparatus may search for, from the database 121 or the Internet 123, a supplement sentence 433, "Mouse is . . . tail", that may enhance an accuracy in translation of the source sentence 431. The machine translation apparatus outputs a second vector value 434 by inputting the supplement sentence 433 to the first encoder 311.

In an example, the machine translation apparatus combines the first vector value 432 and the second vector value 434. The machine translation apparatus may combine the first vector value 432 and the second vector value 434 by separately acquiring the first vector value 432 and the second vector value 434.

In an example, the machine translation apparatus verifies whether a condition is satisfied based on the first vector value 432. The condition indicates that the accuracy in translation exceeds a reference acquired in a training process when a target sentence 435 is output using only the first vector value 432. When the condition is satisfied, the machine translation apparatus may input the first vector value 432 only to the decoder 315 without combining the first vector value 432 and the second vector value 434. When the condition is not satisfied, the machine translation apparatus may acquire a third vector value by combining the first vector value 432 and the second vector value 434, and input the third vector value to the decoder 315. The decoder 315 may output the target sentence, "쥐를 박멸하기 위한 최선의 방법".

Figure 5:
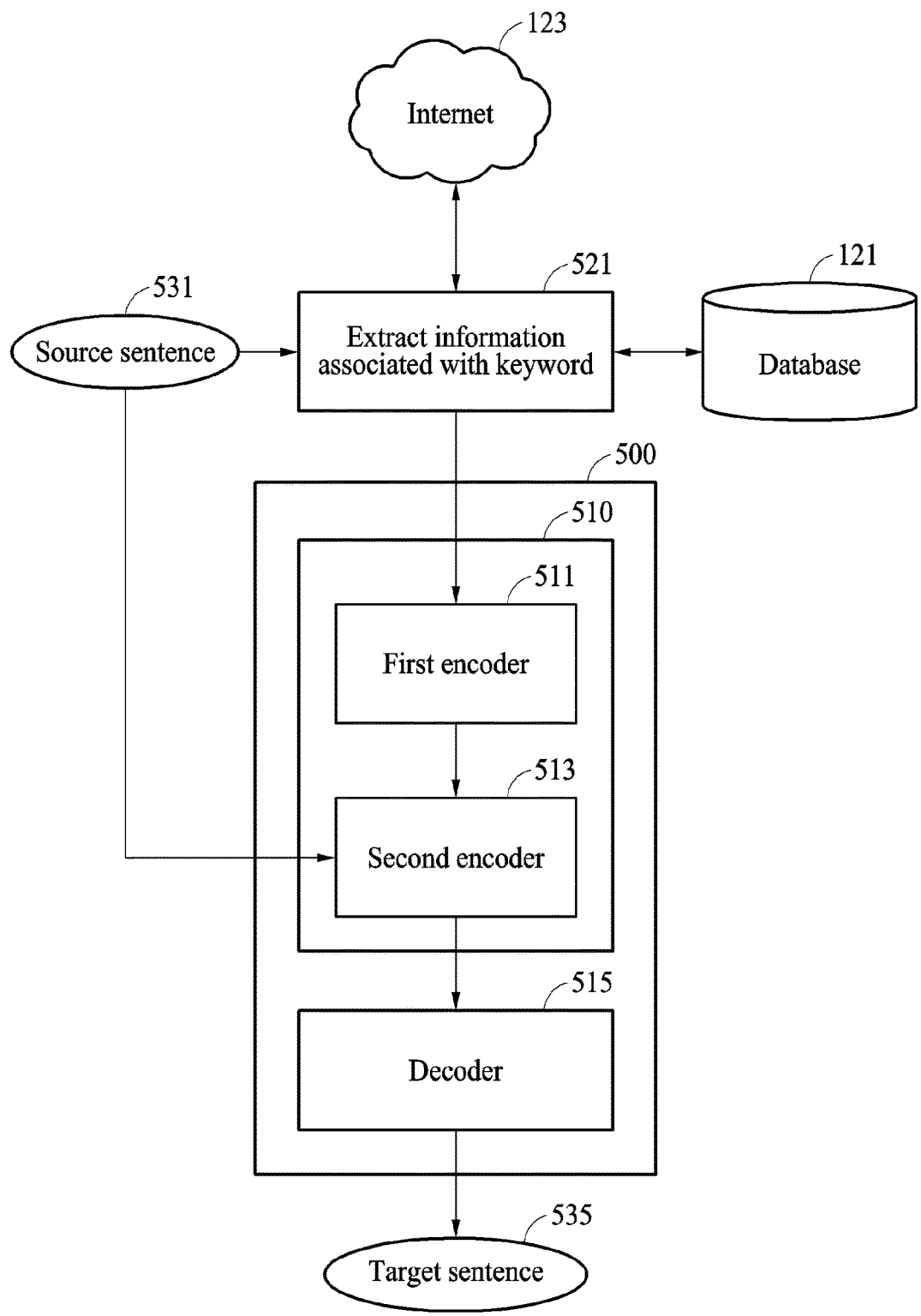
FIG. 5 illustrates an example of performing a machine translation using a first vector value as an input of a second encoder.

FIG. 5 illustrates an example of performing a machine translation using a first vector value as an input of a second encoder.

A machine translation apparatus extracts information associated with a keyword from a source sentence 531. The machine translation apparatus extracts a supplement sentence for enhancing accuracy in translation of the source sentence 531 from the database 121 or the Internet 123 based on the information associated with the keyword in operation 521.

The machine translation apparatus includes a neural network model set 500. The neural network model set 500 includes an integrated encoder 510 and a decoder 515. The integrated encoder 510 includes a first encoder 511 and a second encoder 513.

The machine translation apparatus acquires a second vector value by inputting the supplement sentence to the first encoder 511. The machine translation apparatus acquires a first vector value by inputting the second vector value and the source sentence 531 to the second encoder 513. The machine translation apparatus outputs a target sentence 535 by inputting the first vector value to the decoder 515.

Thus, the first vector value may be acquired from the second vector value and the source sentence 531 using a neural network model-based encoder. The machine translation apparatus may use the supplement sentence by applying the second vector value to the first vector value without combining the first vector value and the second vector value after separately outputting the first vector value and the second vector value.

Figure 6:
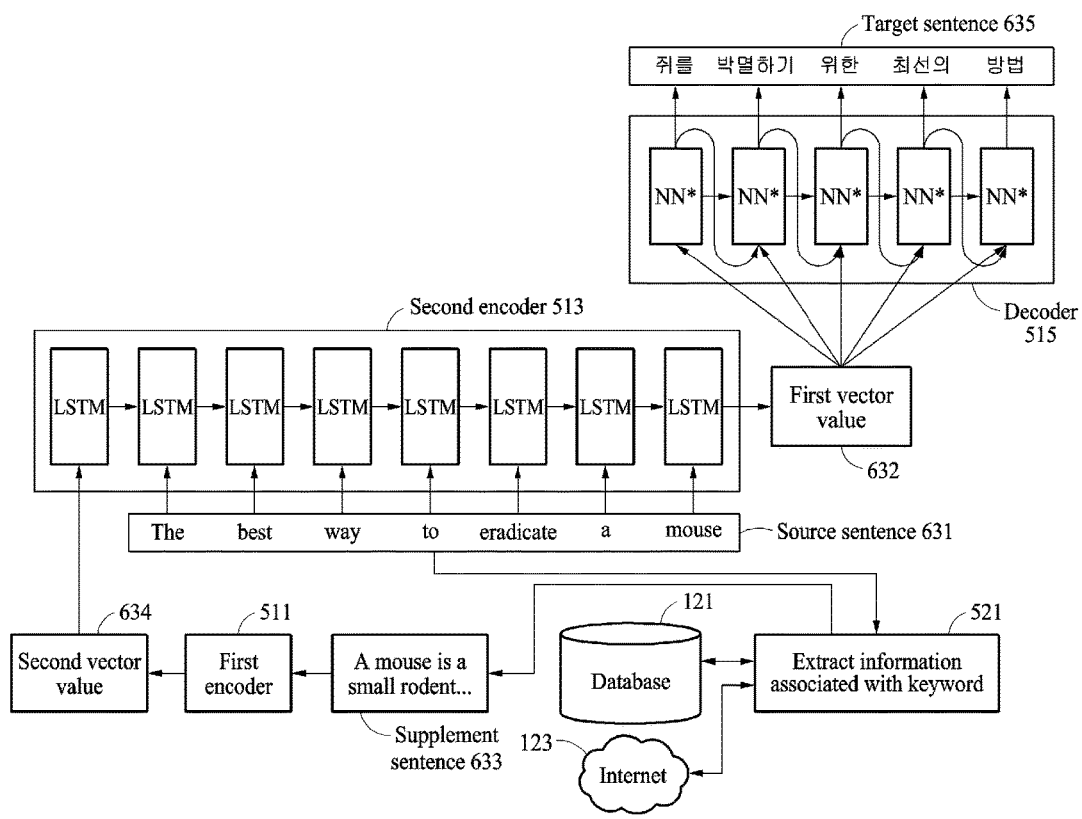
FIG. 6 illustrates an example of using a first vector value as an input of a second encoder using a neural network model.

FIG. 6 illustrates an example of using a first vector value as an input of a second encoder using a neural network model.

A machine translation apparatus extracts information associated with a keyword from a source sentence 631, "The best way to eradicate a mouse", in operation 521. The machine translation apparatus acquires a supplement sentence 633, "A mouse is a small rodent . . . ", from the database 121 or the Internet 123 based on the information associated with the keyword. The machine translation apparatus acquires a second vector value 634 by inputting the supplement sentence 633 to the first encoder 511.

The machine translation apparatus inputs the source sentence 631, "The best way to eradicate a mouse", and the second vector value 634 to the second encoder 513. In an example, the second encoder 513 is a long short-term memory (LSTM). In an example, the machine translation apparatus inputs, to the LSTM, each word in the source sentence 631 in addition to an output of a previous word.

The LSTM is a changed model of a recurrent neural network (RNN) model. The LSTM includes a cell connected with a plurality of gates. The LSTM may store new information on a cell, fetch the information on the cell, or maintain the information on the cell. The cell may determine which information to be stored, to be fetched, to be maintained, or to be removed based on a value of a gate connected to the cell. The LSTM includes a forget gate to remove information. The LSTM may forget information that is not helpful for translation using the forget gate.

The machine translation apparatus acquires a first vector value 632 from the second encoder 513. The machine translation apparatus outputs a target sentence 635, "쥐를 박멸하기 위한 최선의 방법", by inputting the first vector value 632 to the decoder 515. The decoder 515 may be a neural network (NN) model.

Figure 7:
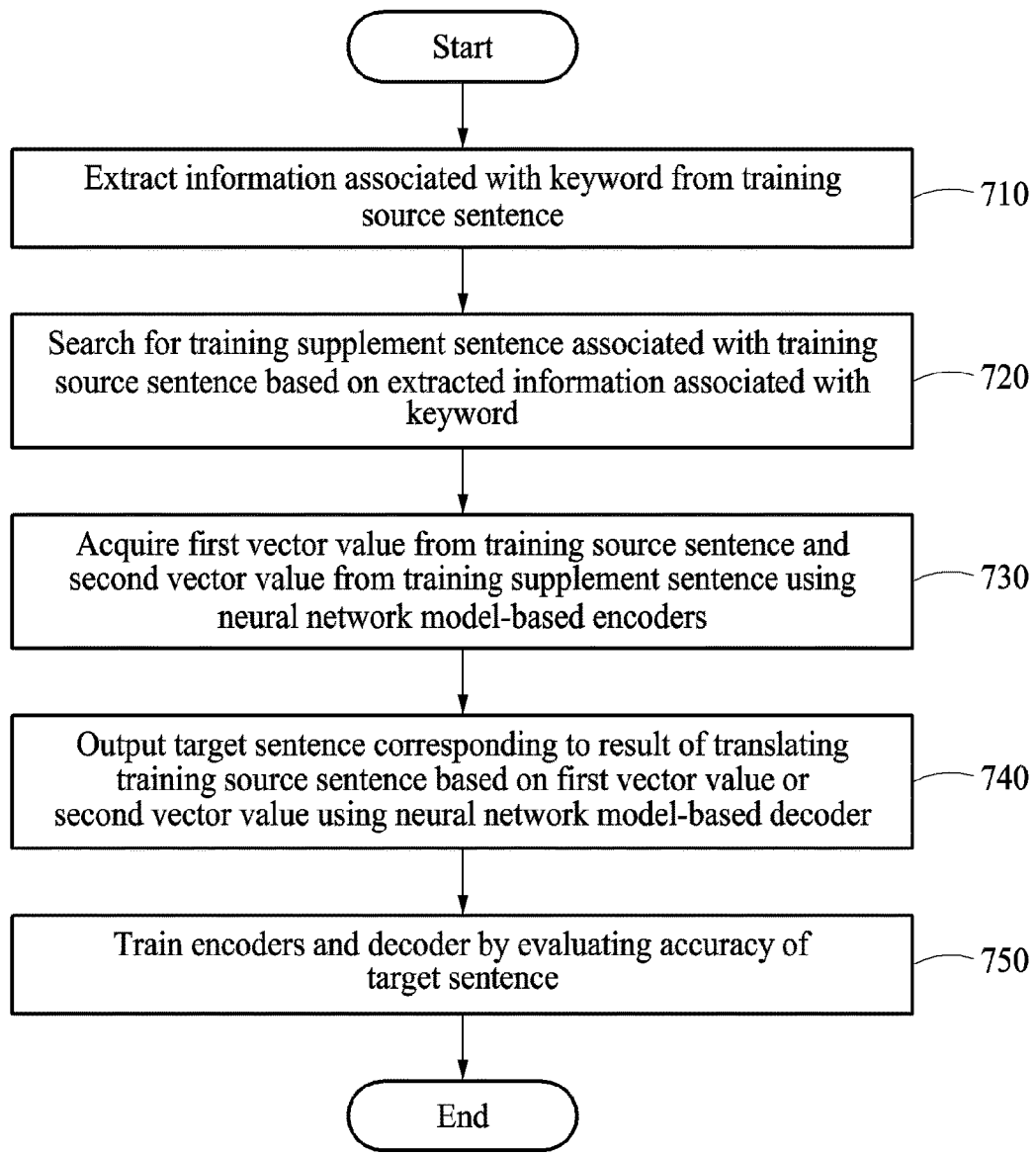
FIG. 7 is a diagram illustrating an example of a method of learning a neural network model for a machine translation.

FIG. 7 is a diagram illustrating an example of a method of learning a neural network model for a machine translation. The operations in FIG. 7 may be performed in the sequence and manner as shown, although the order of some operations may be changed or some of the operations omitted without departing from the spirit and scope of the illustrative examples described. Many of the operations shown in FIG. 7 may be performed in parallel or concurrently. One or more blocks of FIG. 7, and combinations of the blocks, can be implemented by special purpose hardware-based computer that perform the specified functions, or combinations of special purpose hardware and computer instructions. In addition to the description of FIG. 7 below, the descriptions of FIGS. 1-6 is also applicable to FIG. 7, and are incorporated herein by reference. Thus, the above description may not be repeated here.

In operation 710, a training apparatus extracts information associated with a keyword from a training source sentence. For example, the training apparatus extracts the information associated with the keyword based on a number of documents including the keyword, a number of times the keyword appears in the documents, and a number of all documents to search for.

In operation 720, the training apparatus searches for a training supplement sentence associated with the training source sentence based on the extracted information associated with the keyword. The training apparatus may search for a supplement sentence for translating a source sentence from a database or the Internet based on the information associated with the keyword.

In operation 730, the training apparatus acquires a first vector value from the training source sentence and a second vector value from the training supplement sentence using neural network model-based encoders.

In operation 740, the training apparatus outputs a target sentence corresponding to a result of translating the training source sentence based on the first vector value or the second vector value using a neural network model-based decoder. Various methods of combining the first vector value and the second vector value may be used.

In operation 750, the training apparatus trains the encoders and the decoder by evaluating an accuracy of the target sentence. The training apparatus may evaluate accuracy in translation by comparing a target sentence to an accurate result of translating a source sentence included in a parallel corpus.

The training apparatus may adjust an internal parameter of the encoders or the decoder to increase the accuracy in translation. The training apparatus may train the encoders or the decoder to decrease a difference between a target sentence and an actual translated sentence. The training apparatus may achieve an end-to-end training in response to training neural network models by reflecting a result of using a supplement sentence.

Figure 8:
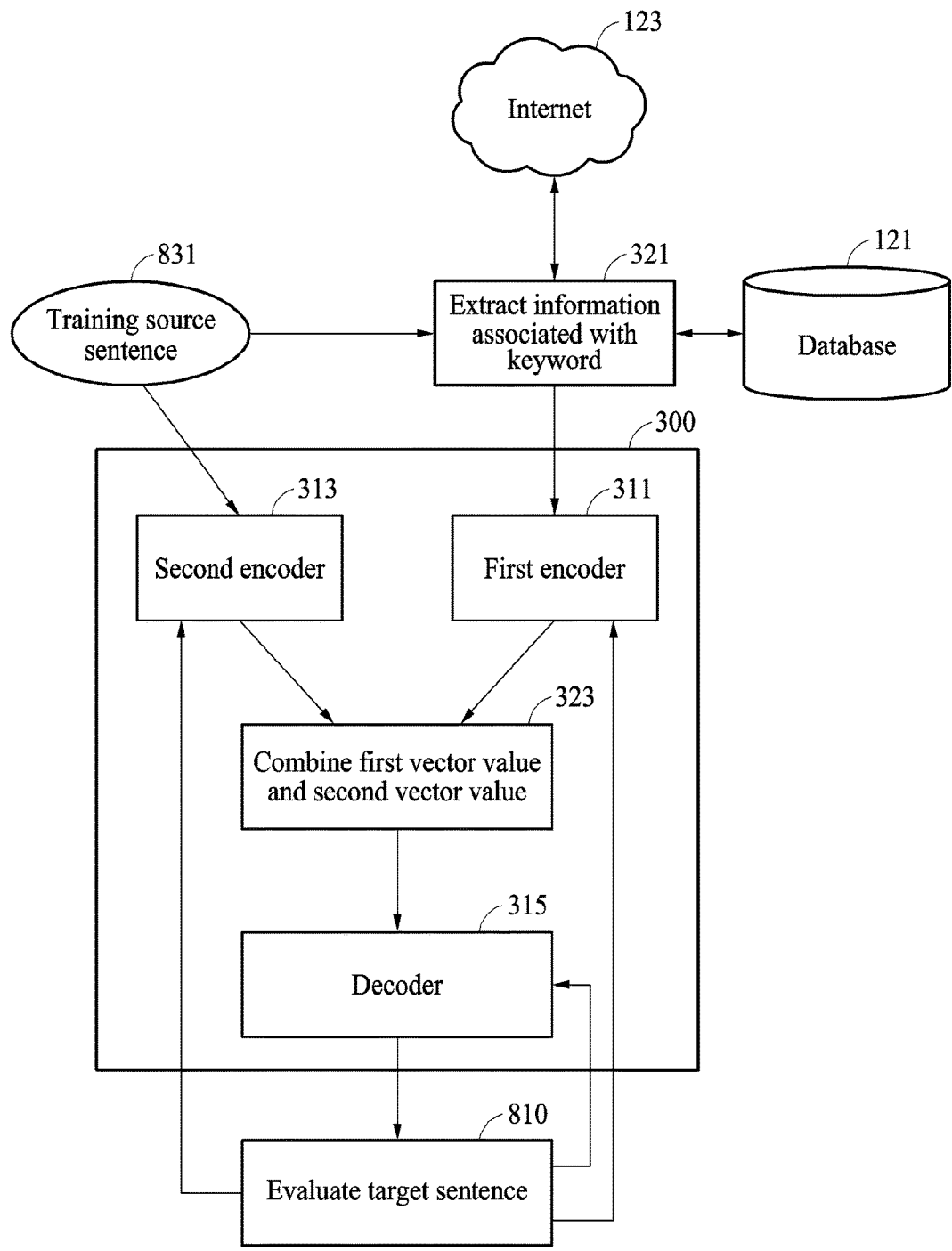
FIG. 8 illustrates an example of learning a neural network model for a machine translation by combining a first vector value and a second vector value.

FIG. 8 illustrates an example of learning a neural network model for a machine translation by combining a first vector value and a second vector value.

A training apparatus extracts information associated with a keyword from a training source sentence 831 in operation 321. The training apparatus may search for a supplement sentence for translating the training source sentence 831 from the database 121 or the Internet 123 based on the information associated with the keyword.

The training apparatus outputs a target sentence using the neural network model set 300. The neural network model set 300 includes the first encoder 311, the second encoder 313, and the decoder 315. The training apparatus acquires a first vector value separately from a second vector value by inputting the supplement sentence to the first encoder 311. The training apparatus may acquire the second vector value separately from the first vector value by inputting the training source sentence 831 to the second encoder 313.

The training apparatus determines a third vector value by combining the first vector value and the second vector value in operation 323. The training apparatus outputs the target sentence by inputting the third vector value to the decoder 315.

The training apparatus evaluates whether the first vector value satisfies a condition. When the first vector value satisfying the condition, the training apparatus may output the target sentence based on the third vector value determined by combining the first vector value and the second vector value. When the first vector value does not satisfying the condition, the training apparatus may output the target sentence based on the first vector value.

The training apparatus may train the neural network model set 300 by evaluating the target sentence in operation 810. The training apparatus may evaluate accuracy in translation by comparing the target sentence to a translation result corresponding to the source sentence. The training apparatus may train the first encoder 311, the second encoder 313, or the decoder 315 until a desired level of accuracy is achieved.

Figure 9:
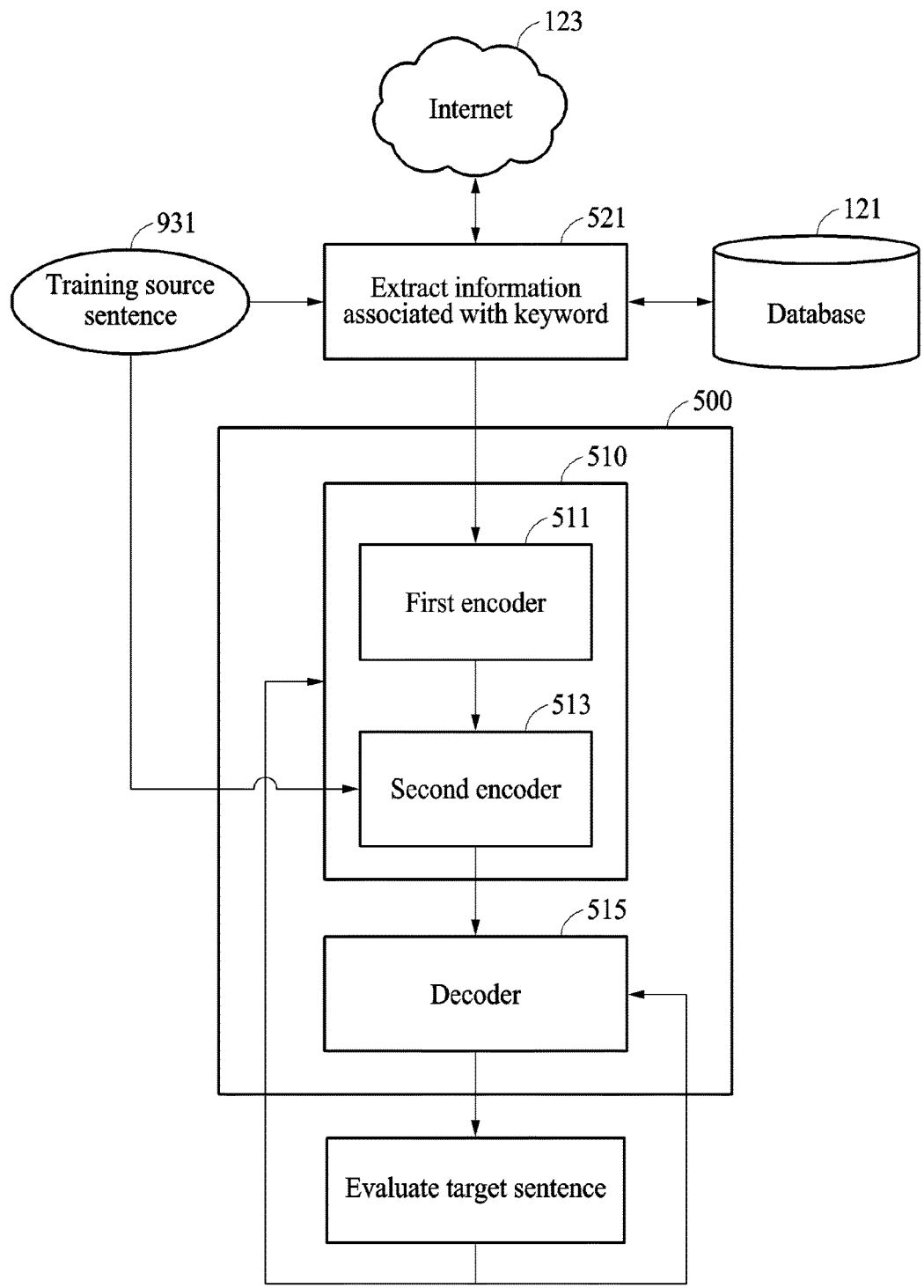
FIG. 9 illustrates an example of learning a neural network model for a machine translation using a first vector value as an input of a second encoder.

FIG. 9 illustrates an example of learning a neural network model for a machine translation using a first vector value as an input of a second encoder.

The machine translation apparatus includes the first encoder 511 and the second encoder 513 in the integrated encoder 510 without separating the first encoder 511 for encoding a supplement sentence from the second encoder 513.

The training apparatus extracts information associated with a keyword based on a training source sentence 931 in operation 521. The training apparatus may search for the supplement sentence for translating the training source sentence 931 from the database 121 or the Internet 123.

The training apparatus may acquire a second vector value by inputting the supplement sentence to the first encoder 511. The first vector value may be acquired from the second vector value and the training source sentence 931 using the second encoder 513 based on a neural network model. The training apparatus may output a target sentence by inputting the first vector value to the decoder 515.

The training apparatus may train the decoder 515 and the integrated encoder 510 by evaluating an accuracy of the target sentence. The training apparatus may train the integrated encoder 510 and the decoder 515 to decrease a difference between the target sentence and an accurate result of translation. The training apparatus may train the integrated encoder 510 and the decoder 515 until a desired level of accuracy is achieved.

Figure 10:
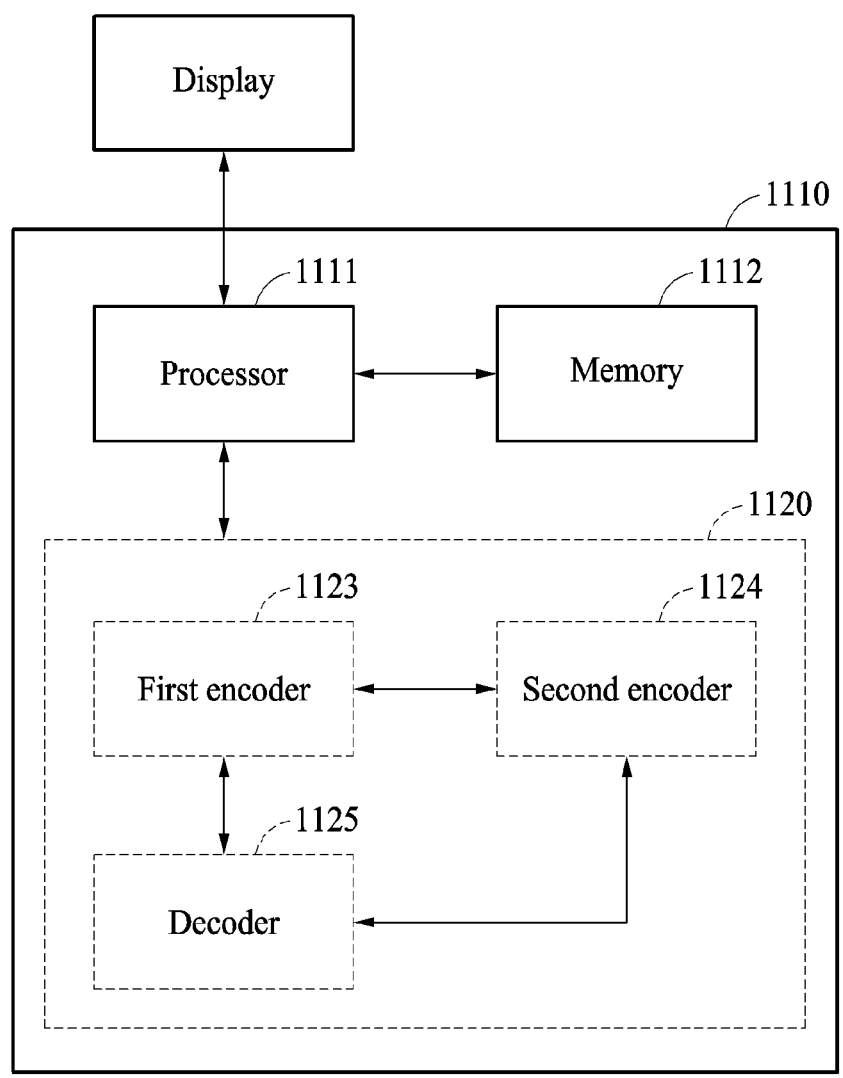
FIG. 10 illustrates an example of a machine translation apparatus.

FIG. 10 illustrates an example of a machine translation apparatus.

A machine translation apparatus 1110 includes a processor 1111, a memory 1112, and a display 1113. The memory 1112 stores instructions to be executable by the processor 1111.

The machine translation apparatus 1110 translates a source sentence using a neural network model. A first encoder 1123, a second encoder 1124, and a decoder 1125 are types of the neural network model. The first encoder 1123, the second encoder 1124, and the decoder 1125 are included in the memory 1112 or included in a storage 1120 separate from the memory 1112.

The processor 1111 extracts information associated with a keyword from the source sentence. The processor 1111 searches for a supplement sentence associated with the source sentence based on the extracted information associated with the keyword. The processor 1111 acquires a first vector value from the source sentence and a second vector value from the supplement sentence.

The processor 1111 outputs a target sentence corresponding to a result of translating the source sentence based on the first vector value and the second vector value. In this example, the first vector value and the second vector value may be combined based on various methods.

In an example, the processor 1111 determines a third vector value by combining the first feature value and the second feature value. The processor 1111 outputs the target sentence based on the third vector value using a neural network model-based decoder.

In an example, the processor 1111 determines whether to use the second vector value based on whether a condition is satisfied. When the first vector value satisfying the condition, the processor 1111 determines the third vector value by combining the first vector value and the second vector value based on a degree acquired in a training process using the neural network model-based decoder. The processor 1111 outputs the target sentence based on the third vector value.

When the first vector value does not satisfying the preset condition, the processor 1111 outputs the target sentence based on the first vector value using the neural network model-based decoder.

In an example, the processor 1111 acquires a second vector using a neural network model-based encoder and a first vector from a source sentence. The processor 1111 acquires the second vector value from the supplement sentence using the first encoder 1123 and then inputs the first vector value and the source sentence to the second encoder 1124. The processor 1111 outputs the target sentence from the second encoder 1124.

In an example, the processor 1111 outputs a target sentence corresponding to a result of translating the source sentence on to the display 1113. In an example, the display 1113 is a physical structure that includes one or more hardware components that provide the ability to render a user interface and/or receive user input. The display 1113 can encompass any combination of display region, gesture capture region, a touch sensitive display, and/or a configurable area. In an example, the display can be embedded in the machine translation apparatus 1110. In an example, the display 1113 is an external peripheral device that may be attached to and detached from the machine translation apparatus 1110. The display 1113 may be a single-screen or a multi-screen display. A single physical screen can include multiple displays that are managed as separate logical displays permitting different content to be displayed on separate displays although part of the same physical screen. The display 1113 may also be implemented as an eye glass display (EGD), which includes one-eyed glass or two-eyed glasses. In an example, the display 1113 is a head-up display (HUD) or a vehicular infotainment system. In another example, processor 1111 outputs a target sentence through an audio signal.

The machine translation apparatus 110 and 1110, and other apparatuses, units, modules, devices, and other components illustrated in FIGS. 1 and 10 that perform the operations described herein with respect to FIGS. 2-9 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. The hardware components also access, manipulate, process, create, and store data in response to execution of the instructions or software. For simplicity, the singular term "processor" or "computer" may be used in the description of the examples described in this application, but in other examples multiple processors or computers may be used, or a processor or computer includes multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software includes at least one of an applet, a dynamic link library (DLL), middleware, firmware, a device driver, an application program storing the method of preventing the collision. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent after gaining a thorough understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A machine translation method using a neural network model, the method comprising:
    extracting information associated with a keyword from a source sentence;
    obtaining a supplement sentence associated with the source sentence based on the extracted information associated with the keyword;
    acquiring, using neural network model-based encoders, a first vector from the source sentence and a second vector from the supplement sentence; and
    outputting, using a neural network model-based decoder, a target sentence corresponding to a translation of the source sentence based on any one or any combination of the first vector or the second vector.

2. The method of claim 1, wherein the outputting of the target sentence comprises:
    determining a third vector by combining the first vector and the second vector; and
    acquiring the target sentence based on the third vector.

3. The method of claim 1, wherein the outputting of the target sentence comprises:
    outputting the target sentence based on a third vector determined by combining the first vector and the second vector in response, to the first vector satisfying a condition; and
    outputting the target sentence based on the first vector, in response to the first vector not satisfying the condition.

4. The method of claim 1, wherein the first vector is acquired from the second vector and the source sentence using the neural network model-based encoders.

5. The method of claim 1, wherein the obtaining of the supplement sentence comprises searching for the supplement sentence based on the information associated with the keyword.

6. The method of claim 5, wherein the extracting of the information associated with the keyword comprises extracting the information associated with the keyword based on any one or any combination of a number of documents including the keyword, a number of times the keyword appears in the documents, and a number of documents searched.

7. The method of claim 5, wherein the searching for the supplement sentence comprises searching for the supplement sentence from any one or any combination of a database or the Internet based on the information associated with the keyword.

8. The method of claim 1, wherein the information associated with the keyword comprises any one or any combination of the keyword, a plurality of keywords, a value indicating the keyword, a value indicating the plurality of keywords, and a value indicating a feature of an entire sentence including the keyword.

9. A non-transitory computer-readable storage medium storing instructions that, when executed by a processor, causes the processor to perform the method of claim 1.

10. A machine translation training method using a neural network model, the method comprising:
    extracting information associated with a keyword from a training source sentence;
    obtaining a training supplement sentence associated with the training source sentence based on the extracted information associated with the keyword;
    acquiring, using neural network model-based encoders, a first vector from the training source sentence and a second vector from the training supplement sentence;
    outputting, using a neural network model-based decoder, a target sentence corresponding to translation of the training source sentence based on any one or any combination of the first vector or the second vector; and
    training the neural network model-based encoders and the neural network model-based decoder by evaluating an accuracy of the target sentence.

11. The method of claim 10, wherein the outputting of the target sentence comprises:
    determining a third vector by combining the first vector and the second vector; and
    acquiring the target sentence based on the third vector.

12. The method of claim 10, wherein the outputting of the target sentence comprises:
    outputting the target sentence based on a third vector determined by combining the first vector and the second vector, in response to the first vector satisfying a condition; and
    outputting the target sentence based on the first vector, in response to the first vector not satisfying the condition.

13. The method of claim 10, wherein the first vector is acquired from the second vector and the training source sentence using the neural network model-based encoders.

14. The method of claim 10, wherein the obtaining of the training supplement sentence comprises searching for the training supplement sentence based on the information associated with the keyword.

15. The method of claim 14, wherein the extracting of the information associated with the keyword comprises extracting the information associated with the keyword based on any one or any combination of a number of documents including the keyword, a number of times the keyword appears in the documents, and a number of documents searched.

16. The method of claim 14, wherein the searching for the training supplement sentence comprises searching for the training supplement sentence from any one or any combination of a database or the Internet based on the information associated with the keyword.

17. The method of claim 10, wherein the accuracy of the target sentence is evaluated based on a comparison of the target sentence to another translation of the training source sentence.

18. A machine translation apparatus using a neural network model, the apparatus comprising:
    a processor configured to:
    extract information associated with a keyword from a source sentence,
    obtain a supplement sentence associated with the source sentence based on the extracted information associated with the keyword,
    acquire, using the neural network model, a first vector from the source sentence and a second vector from the supplement sentence, and
    output, using the neural network model, a target sentence corresponding to a translation of the source sentence based on any one or any combination of the first vector and the second vector.

19. The apparatus of claim 18, wherein the processor is further configured to determine a third vector by combining the first vector and the second vector, and to output the target sentence based on the third vector using a neural network model-based decoder model of the neural network model.

20. The apparatus of claim 18, wherein the processor is further configured to output the target sentence based on a third vector determined by combining the first vector and the second vector using a neural network model-based decoder model of the neural network model, in response to the first vector satisfying a condition, and to output the target sentence based on the first vector using the neural network model-based decoder model, in response to the first vector not satisfying the preset condition.

21. The apparatus of claim 18, wherein the processor is further configured to acquire the first vector from the second vector and the source sentence using neural network model-based encoders model of the neural network model.

22. A translation apparatus based on a neural network model set, the apparatus comprising:
    a sensor configured to receive a source sentence; and
    a processor configured to
    extract information associated with a keyword from the source sentence,
    obtain a supplement sentence associated with the source sentence based on the extracted information,
    acquire, using neural network model-based encoders, a first vector from the source sentence and a second vector from the supplement sentence, and
    output, using neural network model-based decoder, a translated sentence based on any one or any combination of the first vector and the second vector to a display,
    wherein the neural network model set comprises the neural network model-based encoders, and the neural network model-based decoder.

23. The translation apparatus of claim 22, further comprising a memory configured to store instructions to be executed by the processor, to store the neural network model set, the source sentence, and the supplement sentence.

* * * * *